United States Patent
Yost et al.

(10) Patent No.: US 7,469,097 B2
(45) Date of Patent: Dec. 23, 2008

(54) METHOD AND APPARATUS FOR COPING WITH CONDITION IN WHICH SUBJECT IS TOO CLOSE TO DIGITAL IMAGING DEVICE FOR ACCEPTABLE FOCUS

(75) Inventors: Jason E. Yost, Windsor, CO (US); Amy E. Battles, Windsor, CO (US); Daniel M. Bloom, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 381 days.

(21) Appl. No.: 11/305,485

(22) Filed: Dec. 15, 2005

(65) Prior Publication Data

US 2007/0140678 A1    Jun. 21, 2007

(51) Int. Cl.
*G03B 13/18* (2006.01)
*G03B 17/00* (2006.01)

(52) U.S. Cl. .................. 396/77; 396/88; 396/147; 348/240.3; 348/346; 348/347; 348/333.04

(58) Field of Classification Search .............. 396/77, 396/88, 147; 348/240.3, 346, 347, 333.02, 348/333.04
See application file for complete search history.

(56) References Cited

U.S. PATENT DOCUMENTS

| | | | | |
|---|---|---|---|---|
| 4,786,987 A | * | 11/1988 | Fujimura et al. | 386/117 |
| 5,172,156 A | | 12/1992 | Tsuru | |
| 5,615,398 A | * | 3/1997 | Matsuyama | 396/77 |
| 5,940,634 A | | 8/1999 | Nakamura | |
| 5,978,607 A | | 11/1999 | Teremy et al. | |
| 6,028,981 A | | 2/2000 | Hirasawa | |
| 6,750,914 B2 | * | 6/2004 | Sannoh et al. | 348/346 |
| 2002/0130961 A1 | * | 9/2002 | Lee et al. | 348/333.03 |
| 2003/0081137 A1 | * | 5/2003 | Yamazaki | 348/354 |
| 2006/0029381 A1 | * | 2/2006 | Onozawa | 396/147 |

FOREIGN PATENT DOCUMENTS

WO   WO 2006/013994   2/2006
WO   WO 2006013994   2/2006

OTHER PUBLICATIONS

Partial International Search Report for International Application No. PCT/US2006/045801. Report issued Apr. 12, 2007.

* cited by examiner

*Primary Examiner*—W. B. Perkey

(57) ABSTRACT

A digital imaging device automatically detects that a subject is too close to the device for acceptable focus to be achieved and informs the user, takes automatic corrective action, or both.

18 Claims, 11 Drawing Sheets

US 7,469,097 B2

METHOD AND APPARATUS FOR COPING WITH CONDITION IN WHICH SUBJECT IS TOO CLOSE TO DIGITAL IMAGING DEVICE FOR ACCEPTABLE FOCUS

FIELD OF THE INVENTION

The present invention relates generally to digital photography and more specifically to techniques for automatically focusing a digital imaging device.

BACKGROUND OF THE INVENTION

Most digital imaging devices such as digital cameras or digital camcorders have autofocus lens systems. As with any lens, however, the digital imaging device cannot achieve optimum focus if the subject is too close to the lens. In some prior-art digital imaging devices, the autofocus system is not activated during the composition of a picture until some impetus is received from the user (e.g., the user at least partially depresses the shutter button). Consequently, the user does not become aware that the subject is too close until after he or she has already composed the image, which can frustrate the user. Other prior-art digital imaging devices have autofocus systems (e.g., continuous autofocus) that are active during the composition of a picture without impetus from the user, but they also fail to inform the user that the subject is too close until the user attempts to capture an image.

It is thus apparent that there is a need in the art for an improved method and apparatus for coping with a condition in which a subject is too close to a digital imaging device for acceptable focus to be achieved.

DETAILED DESCRIPTION OF THE INVENTION

A digital imaging device may automatically detect, without impetus from a user, that a subject is too close to the digital imaging device for acceptable focus to be achieved and inform the user of the situation. In another embodiment, the digital imaging device may detect, without impetus from a user, that a subject is too close to the digital imaging device for acceptable focus to be achieved, automatically adjust the focal length of the lens (i.e., zoom in or out somewhat), and prompt the user to move in a direction that makes acceptable focus achievable while allowing the user to maintain approximately the same magnification factor as before. In yet another embodiment, detecting that the subject is too close to the digital imaging device for acceptable focus to be achieved, informing the user of the situation, and automatically adjusting the focal length of the lens and prompting the user to move the digital imaging device in a direction that makes acceptable focus achievable may be combined.

Figure 1:
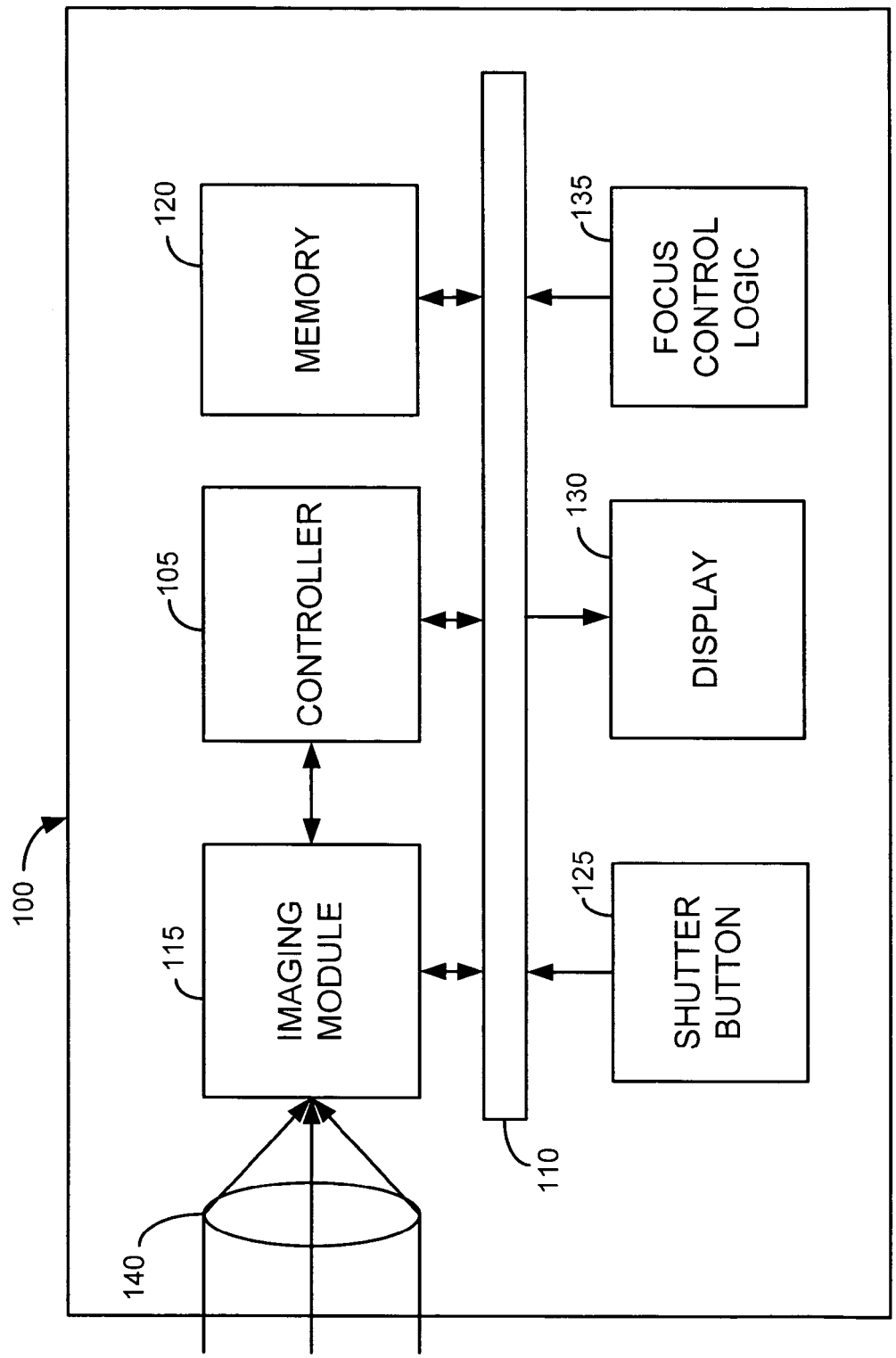
FIG. 1 is a functional block diagram of a digital imaging device in accordance with an illustrative embodiment of the invention.

FIG. 1 is a functional block diagram of a digital imaging device 100 in accordance with an illustrative embodiment of the invention. Digital imaging device 100 may be any device capable of converting an optical image of a scene to a digital image. Examples include, without limitation, digital cameras, digital camcorders, personal digital assistants (PDAs) with digital camera functionality, and radiotelephones (e.g., cellular or PCS phones) with digital camera functionality. In FIG. 1A, controller 105 (e.g., a microprocessor or microcontroller) may communicate over data bus 110 with imaging module 115, memory 120, shutter button 125, display 130, and focus control logic 135. Digital imaging device 100 may include other input controls (not shown in FIG. 1) besides shutter button 125. For example, digital imaging device 100 may have navigational buttons for browsing menus and captured digital images or other input controls for controlling the operation of digital imaging device 100. Display 130 may be, for example, a liquid crystal display (LCD).

Focus control logic 135 comprises an autofocus system for automatically focusing optical system 140 (e.g., a lens). Particular aspects of focus control logic 135 that go beyond conventional autofocus systems will be explained in greater detail in later portions of this detailed description. In one embodiment, focus control logic 135 comprises firmware that is part of memory 120. For example, focus control logic 135 may comprise firmware program instructions that are executed by controller 105. In general, focus control logic 135 may be implemented in hardware, software, firmware, or any combination thereof.

Optical system 140 produces optical images that may be converted to digital images by imaging module 115.

In digital imaging device 100, autofocus (one aspect of focus control logic 135) may be operative during the composition of a picture (e.g., during a "live preview" mode of digital imaging device 100) despite the lack of any impetus from a user. Throughout this detailed description and the claims, "impetus from a user" means any input or stimulus to digital imaging device 100 from the user. One example of such impetus is the user's partial depression of shutter button 125 (e.g., to the intermediate "S1" position short of "S2," the position at which an image is captured). Another example is the user's actuating of a different input control of digital imaging device 100 to affect the operation of autofocus in some way (e.g., to turn on autofocus).

Autofocus algorithms of various types are well known to those skilled in the digital photography art. An autofocus algorithm typically uses a figure of merit such as "sum modulus difference" to evaluate various focus positions of the lens. In one common approach, "continuous autofocus," the autofocus system is active continually during the composition of an image (e.g., throughout "live preview" mode). More efficient variations of continuous autofocus have been developed in which the autofocus system is capable of adjusting focus at any time during composition but does so only when truly necessary (e.g., when the digital imaging device detects a change in the scene during live preview). One example of such an autofocus system is described in pending U.S. patent application Ser. No. 10/762,872, "Method and Apparatus for Continuous Focus and Exposure in a Digital Imaging Device," which was filed on Jan. 21, 2004 and published on Jul. 21, 2005 with publication number 20050157198, the disclosure of which is incorporated herein by reference. Any suitable autofocus algorithm that is enabled throughout the composition of a picture may be used in conjunction with the invention.

Figure 2:
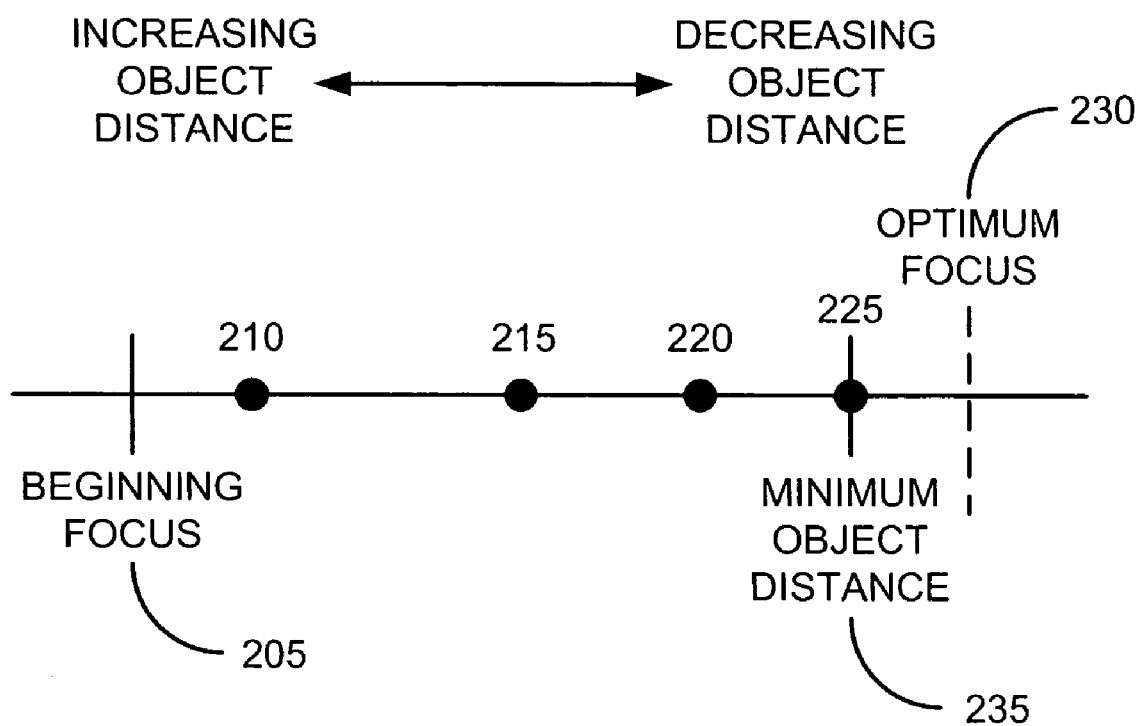
FIG. 2 is a conceptual diagram illustrating one manner in which the digital imaging device shown in FIG. 1 can detect that a subject is too close to the digital imaging device for acceptable focus to be achieved, in accordance with an illustrative embodiment of the invention.

FIG. 2 is a conceptual diagram illustrating one manner in which digital imaging device 100 can detect that a subject is too close to digital imaging device 100 for acceptable focus to be achieved, in accordance with an illustrative embodiment of the invention. Focus control logic 135 can detect that the subject is too close by determining that focus is improving with iterative adjustment of optical system 140 toward shorter focus depths but that acceptable focus has not yet been achieved when optical system 140 is focused at a minimum focus depth or "minimum object distance" (i.e., the shortest subject distance at which optical system 140 can focus). Those skilled in the art will recognize that there is a minimum object distance for each focal length of a variable-focal-length (zoom) lens.

In FIG. 2, a range of focus depths (distances at which an object is in focus) is represented on a continuum with increasing focus depth to the left and decreasing focus depth to the right. It is assumed, for purposes of FIG. 2, that digital imaging device 100 is pointed at a subject that is too close for acceptable focus to be achieved (see the definition of "acceptable focus" below). When focus control logic 135 begins the autofocus sequence during live preview, optical system 140 happens to be set to beginning focus 205 in this example, and focus control logic 135 makes focus adjustments 210, 215, 220, and 225 toward optimum focus 230. However, since optical system 140 cannot focus on a subject closer than minimum object distance 235, optimum focus 230 is never reached. Normally, focus control logic 135 would overshoot optimum focus 230 slightly to locate optimum focus 230. Since focus control logic 135 can determine that focus was improving with focus adjustments 210, 215, 220, and 225 but that optimum focus 230 was never overshot, focus control logic can, therefore, determine that the subject is too close to digital imaging device 100 for acceptable focus to be achieved. Throughout this detailed description and the claims, "acceptable focus" means that the focus setting of optical system 140 is within a predetermined tolerance of optimum focus 230. In the example of FIG. 2, that predetermined tolerance is presumed to have been exceeded.

Once digital imaging device 100 has detected that a subject is too close to digital imaging device 100 for acceptable focus to be achieved, digital imaging device 100 may, in some embodiments, inform the user of that fact. The user may be informed of the situation in any of a number of different ways, including, without limitation, sight, sound, or both. For example, display 130 of digital imaging device 100 may be altered in some way upon detection of a too-close subject.

Figure 3A:
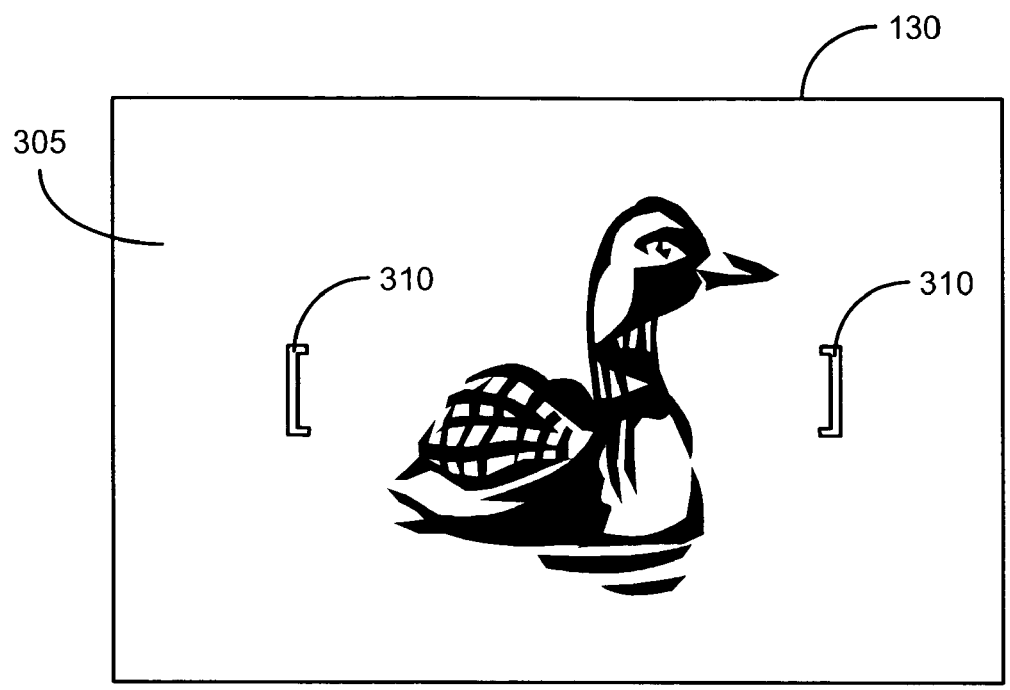
FIGS. 3A and 3B are illustrations showing one manner of altering the display of a digital imaging device to inform a user that a subject is too close to the digital imaging device for acceptable focus to be achieved, in accordance with an illustrative embodiment of the invention.
Figure 3B:
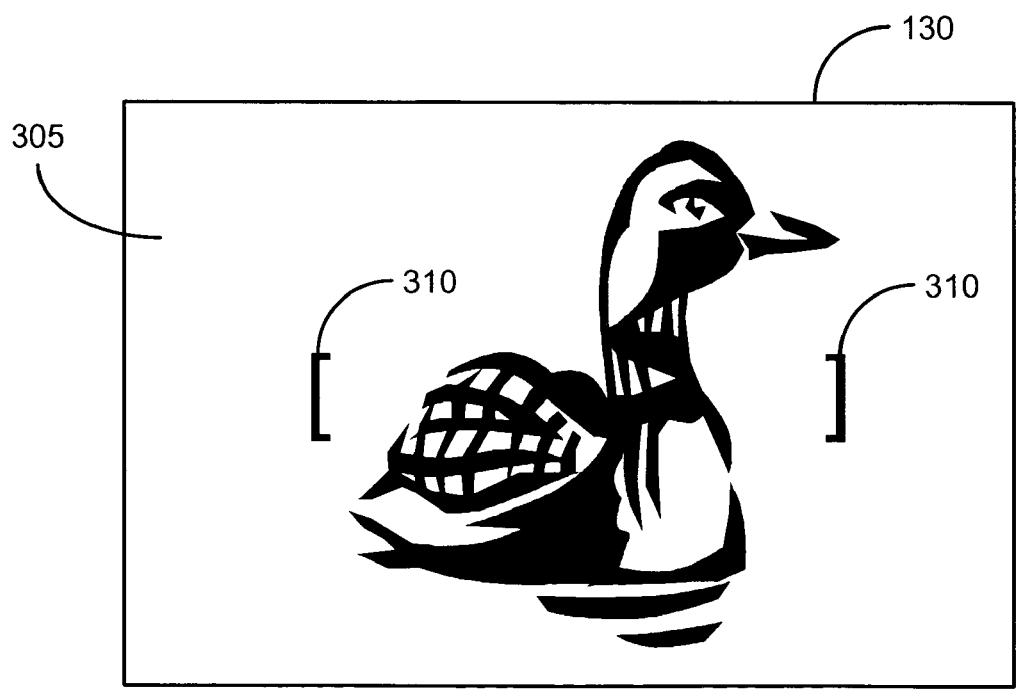

FIGS. 3A and 3B are illustrations showing one manner of altering display 130 of digital imaging device 100 to inform a user that a subject is too close to digital imaging device 100 for acceptable focus to be achieved, in accordance with an illustrative embodiment of the invention. In FIG. 3A, a live preview image 305 is shown on display 130, and digital imaging device 100 has achieved acceptable focus. Display 130 may include focus brackets 310, the appearance of which may be altered to convey messages to the user. In the example of FIG. 3A, focus brackets 310 are shown in outline form. In FIG. 3B, after the user has moved closer to the subject than minimum object distance 235, focus control logic 135 may change focus brackets 310 from outline form to solid to indicate that the subject is too close for acceptable focus to be achieved. In one particular embodiment, the color of focus brackets 310 may be changed to convey this message. For example, focus brackets 310 may be changed from some other color (e.g., white or green) to amber to alert the user that digital imaging device 100 is too close to the subject for acceptable focus to be achieved. As explained above, all of this occurs without impetus from the user.

Figure 3C:
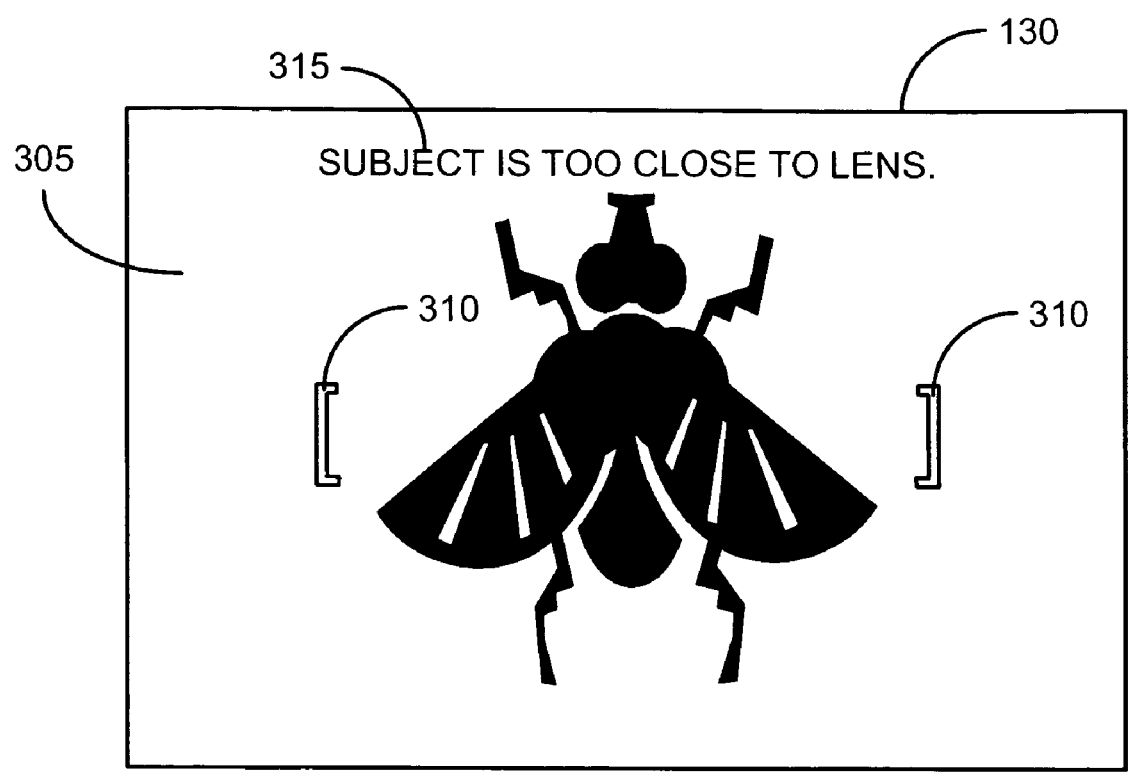
FIG. 3C is an illustration showing another manner of altering the display of a digital imaging device to inform a user that a subject is too close to the digital imaging device for acceptable focus to be achieved, in accordance with another illustrative embodiment of the invention.

FIG. 3C is an illustration showing another manner of altering display 130 of digital imaging device 100 to inform a user that a subject is too close to digital imaging device 100 for acceptable focus to be achieved, in accordance with another illustrative embodiment of the invention. In FIG. 3C, a text message 315 is shown on display 130. The particular text message shown in FIG. 3C is merely one example. In other embodiments, the technique involving focus brackets 310 shown in FIGS. 3A and 3B may be combined with text message 315.

In other embodiments, digital imaging device 100 may, when a subject is too close to digital imaging device 100 for acceptable focus to be achieved, take automatic corrective action. In some embodiments, this can include explicitly informing the user that the subject is too close for acceptable focus to be achieved (see FIGS. 4A, 4B, and 4E below). In other embodiments, digital imaging device 100 may take automatic corrective action, including prompting the user to assist in correcting the problem, without explicitly informing the user that the subject is too close to digital imaging device 100 for acceptable focus to be achieved (see FIGS. 4C and 4D below).

One manner of implementing automatic corrective action is as follows. First, focus control logic 135 may determine the approximate distance range within which the subject lies (e.g., less than 12 in.), even though focus control logic 135 is unable to achieve acceptable focus because the subject is too close to digital imaging device 100. Secondly, if optical system 140 comprises a zoom (variable-focal-length) lens, focus control logic 135 may automatically select a different focal length for optical system 140. Focus control logic 135 may make such a selection by, for example, consulting a lookup table stored in memory 120 that was constructed during calibration of optical system 140 at the manufacturer. Finally, focus control logic can guide the user in exploiting the tradeoff between focal length and minimum object distance 235. In general, a longer focal length (more zoom) implies a greater minimum object distance; conversely, a shorter focal length (less zoom) implies a smaller minimum object distance. Many digital camera users are not aware that the same overall magnification factor in a digital image can be achieved at multiple combinations of zoom and focus distance. For example, a close up can be taken by using a short focal length and getting very close to the subject. Alternatively, optical system 140 may be zoomed in to a greater extent from a greater distance to the subject. Of course, those skilled in the art will recognize that the depth of field is different in the two cases, even though the overall magnification factor (size of the subject in the image) may be the same. After selecting a different focal length for optical system 140 as explained above, focus control logic 135 may prompt the user to move digital imaging device 100 in a direction that makes acceptable focus achievable.

Automatic corrective action may be implemented in an alternative manner involving aperture instead of focal length. Once digital imaging device 100 has determined that the subject is too close for acceptable focus to be achieved, focus control logic 135 may automatically select an aperture of optical system 140 that provides acceptable focus through increased depth of field (i.e., a high-f-number—or small diameter—aperture). This approach involves a tradeoff between exposure and focus because choosing such an aperture may result in underexposure of a captured digital image. Consequently, focus control logic 135 may compensate for the underexposure by applying additional analog or digital gain to the captured digital image. Applying additional gain to an underexposed digital image, however, can result in degraded image quality (e.g., graininess or noisiness). Optionally, focus control logic 135 may inform a user that the subject is too close. Also, optionally, focus control logic 135 may inform the user that an aperture is available that will achieve acceptable focus but that selecting that aperture might degrade image quality. The user may be allowed to confirm usage of the suggested aperture before capturing a digital image.

Figure 4A:
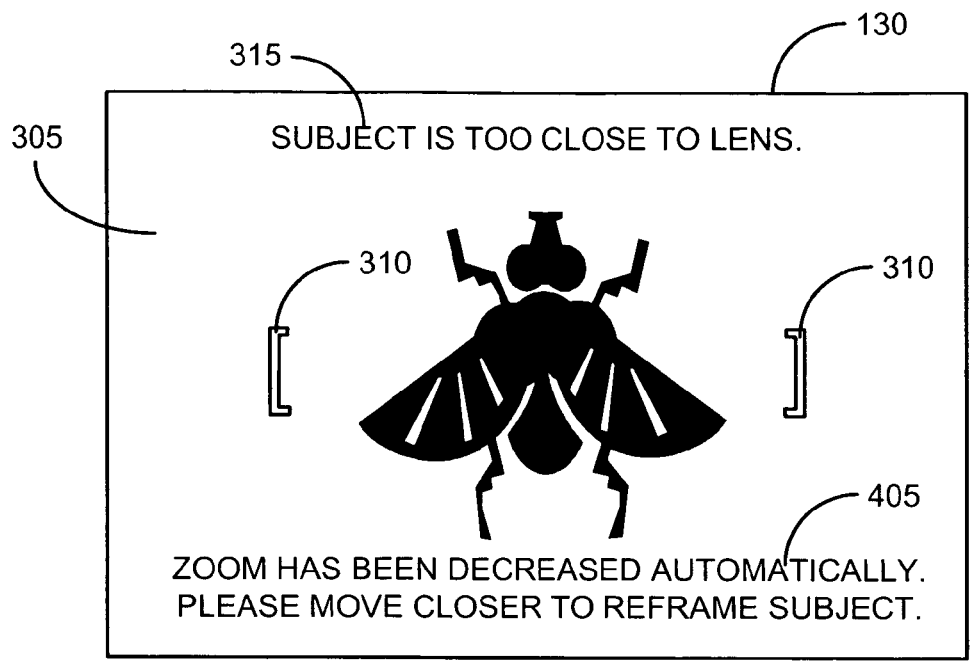
FIGS. 4A and 4B are illustrations of the automatic correction of a condition in which a subject is too close to a digital imaging device for acceptable focus to be achieved, in accordance with an illustrative embodiment of the invention.
Figure 4B:
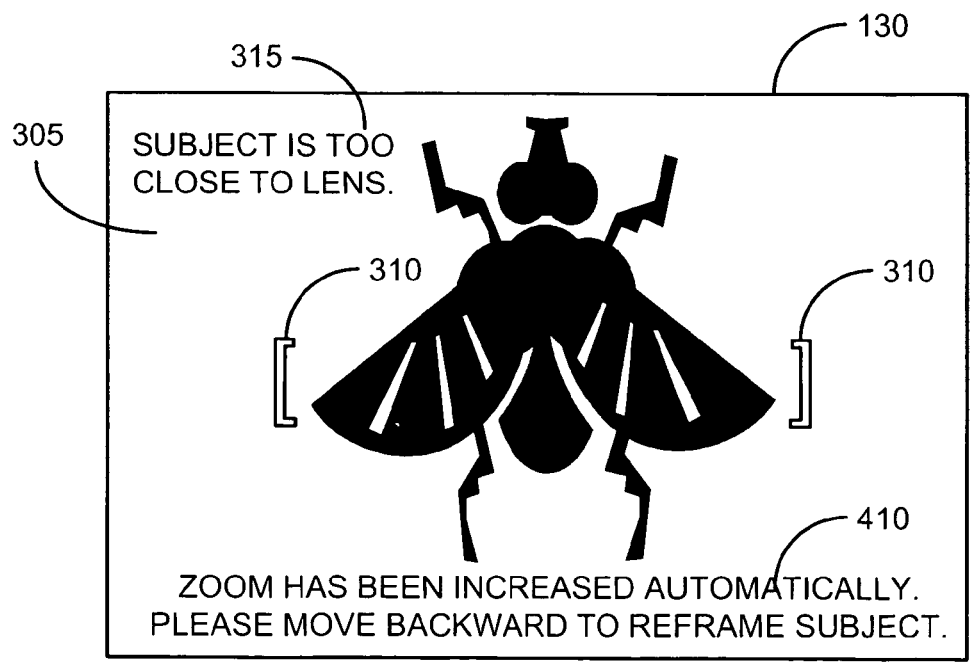

FIGS. 4A and 4B are illustrations of the automatic correction of a condition in which a subject is too close to digital imaging device 100 for acceptable focus to be achieved, in accordance with illustrative embodiments of the invention. In the embodiments illustrated in FIGS. 4A and 4B, informing the user that the subject is too close to digital imaging device 100 for acceptable focus to be achieved is combined with automatic correction of that situation. In FIG. 4A, optical system 140 is presumed to be at a relatively high zoom factor, which implies a larger minimum object distance 235, as explained above. Once focus control logic 135 has detected that the subject is too close for proper focus, it may automatically select a smaller focal length for optical system 140 and prompt the user via text message 405 on display 130 to move closer to the subject to reframe it (i.e., to maintain more or less the same magnification factor as at the original zoom setting). In the example of FIG. 4A, text message 315 is used to alert the user of the focus problem. In FIG. 4B, optical system 140 is presumed to be set to a short focal length. However, if the user is closer than minimum object distance 235 for that focal length, acceptable focus still cannot be achieved. One manner in which focus control logic 135 may attempt to correct for this is to select, based on the estimated distance to the subject, a longer focal length (higher zoom factor) for optical system 140 and prompt the user, via text message 410, to step back from the subject somewhat to reframe it. In the example of FIG. 4B, the appearance (e.g., color) of focus brackets 310 may be altered to inform the user of the focus problem.

Figure 4C:
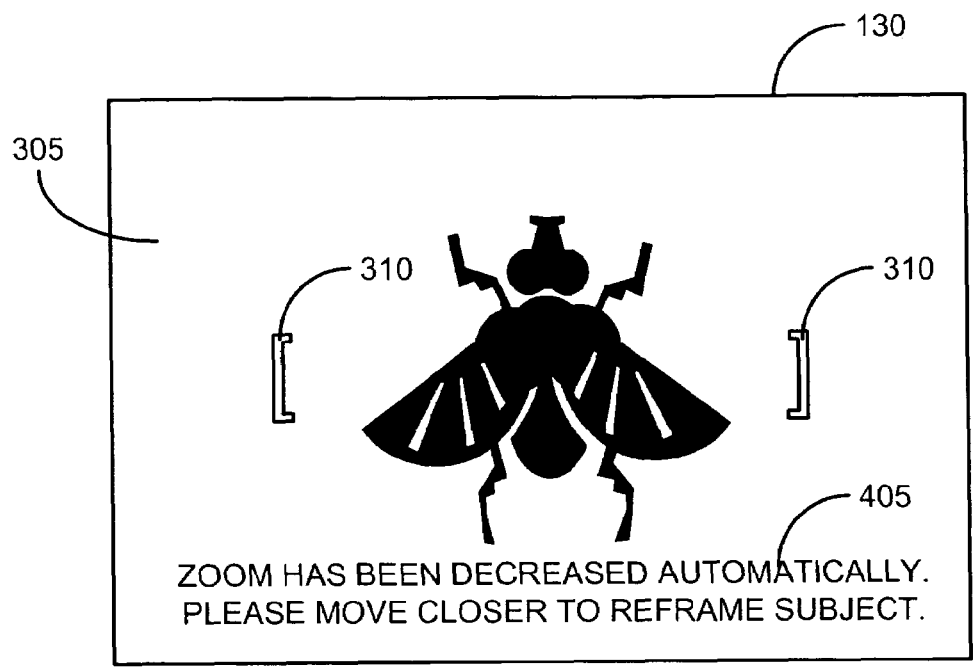
FIGS. 4C and 4D are illustrations of the automatic correction of a condition in which a subject is too close to a digital imaging device for acceptable focus to be achieved, in accordance with another illustrative embodiment of the invention.
Figure 4D:
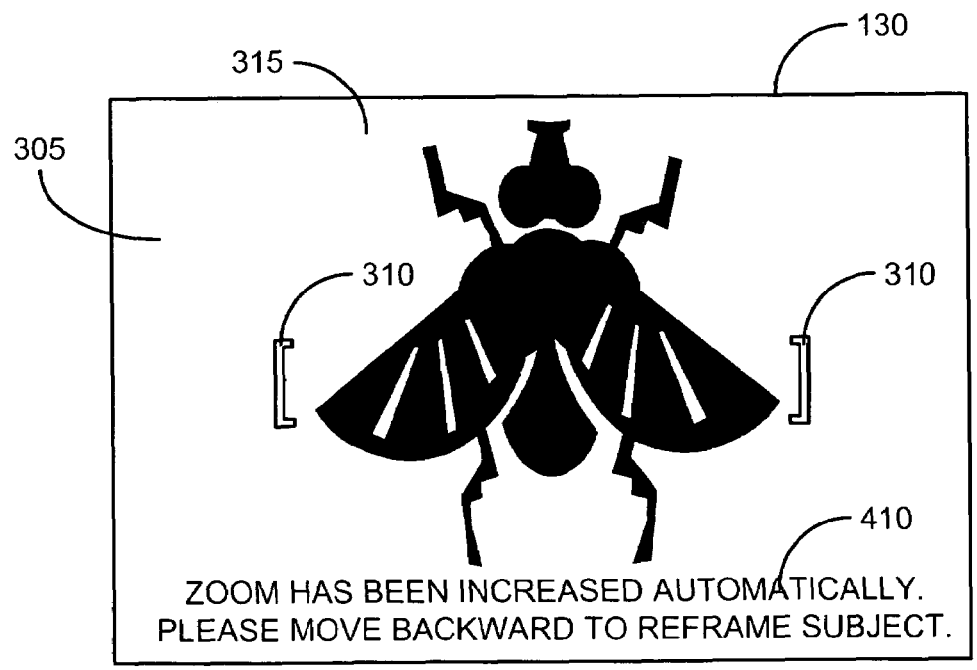

FIGS. 4C and 4D are illustrations of the automatic correction of a condition in which a subject is too close to digital imaging device 100 for acceptable focus to be achieved, in accordance with another illustrative embodiment of the invention. These figures simply illustrate that focus control logic 135 may perform automatic correction and prompting of the user without explicitly informing the user that the subject is too close to digital imaging device 100 for acceptable focus to be achieved.

Figure 4E:
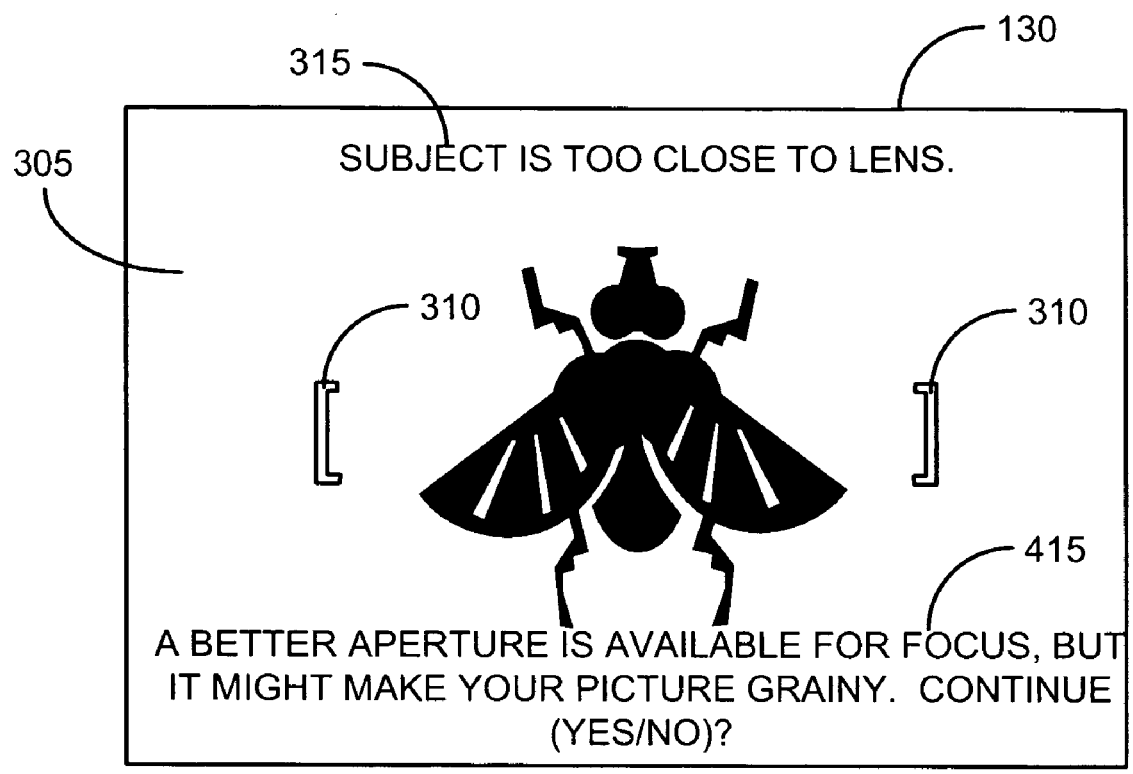
FIG. 4E is an illustration of the automatic correction of a condition in which a subject is too close to a digital imaging device for acceptable focus to be achieved, in accordance with yet another illustrative embodiment of the invention.

FIG. 4E is an illustration of the automatic correction of a condition in which a subject is too close to digital imaging device 100 for acceptable focus to be achieved, in accordance with yet another illustrative embodiment of the invention. In FIG. 4E, focus control logic 135, after detecting that the subject is too close for acceptable focus to be achieved, may automatically select an aperture of optical system 140 that provides acceptable focus (despite resulting underexposure). Focus control logic 135 may be configured to apply additional gain to a captured digital image to compensate for the underexposure. As illustrated in FIG. 4E, focus control logic 135 may inform the user (via message 415) that a better aperture is available for focus but that use of that aperture might result in degraded image quality (e.g., graininess). At that point, the user may also be given an opportunity to confirm or cancel use of that suggested aperture. Optionally, as illustrated in FIG. 4E, focus control logic 135 may additionally inform the user (via message 315) that the subject is too close to digital imaging device 100 for acceptable focus to be achieved.

Figure 5A:
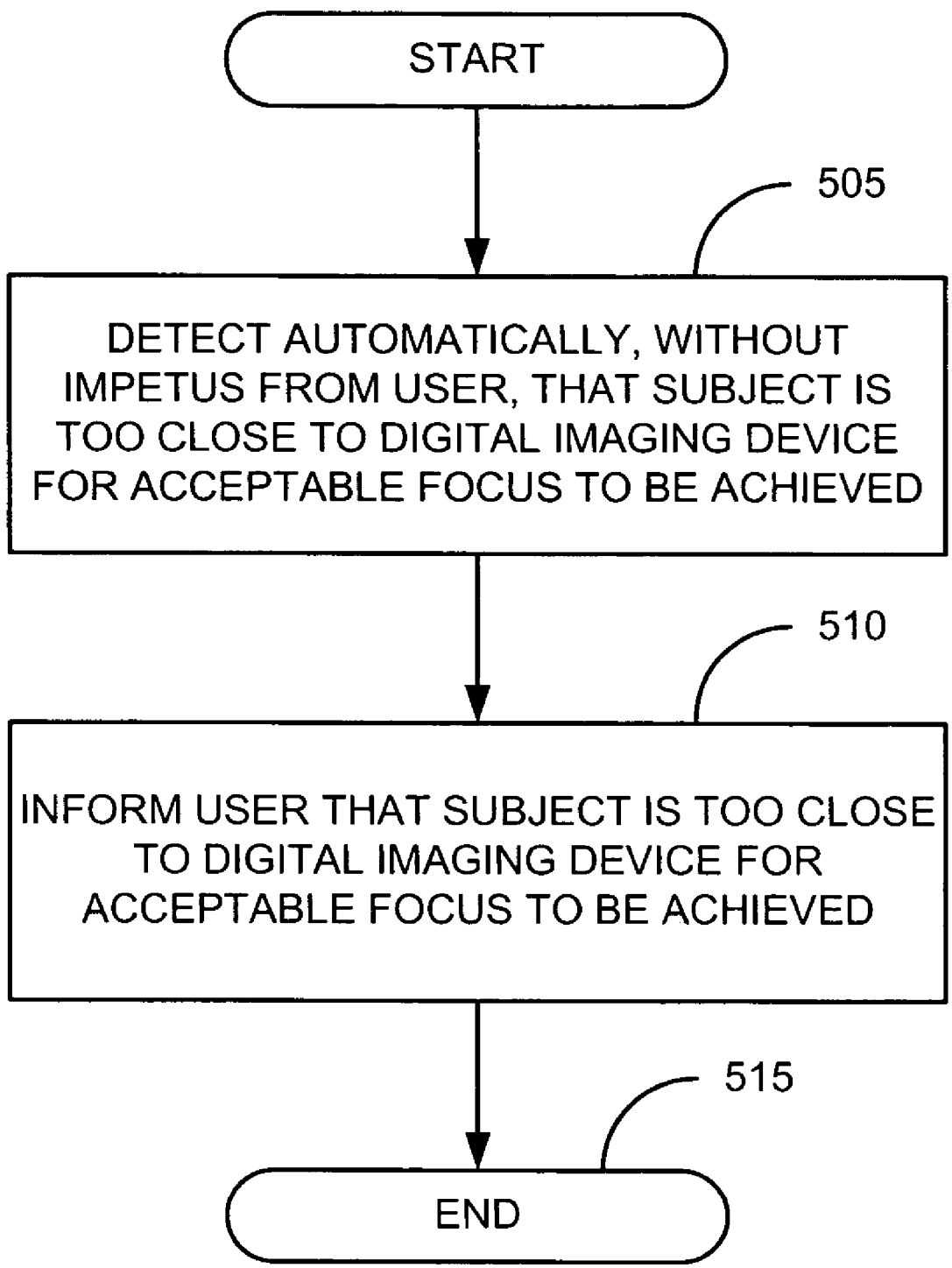
FIG. 5A is a flowchart of the operation of the digital imaging device shown in FIG. 1 in accordance with an illustrative embodiment of the invention.

FIG. 5A is a flowchart of the operation of digital imaging device 100 in accordance with an illustrative embodiment of the invention. At 505, focus control logic 135 may detect automatically, without impetus from a user, that a subject is too close to digital imaging device 100 for acceptable focus to be achieved. As explained above, this may be accomplished by determining that focus is improving upon iterative adjustment of optical system 140 but that optimum focus 230 is never reached by the time optical system 140 is focused at minimum object distance 235. At 510, the user may be informed of the problem with focus, and the process may terminate at 515.

Figure 5B:
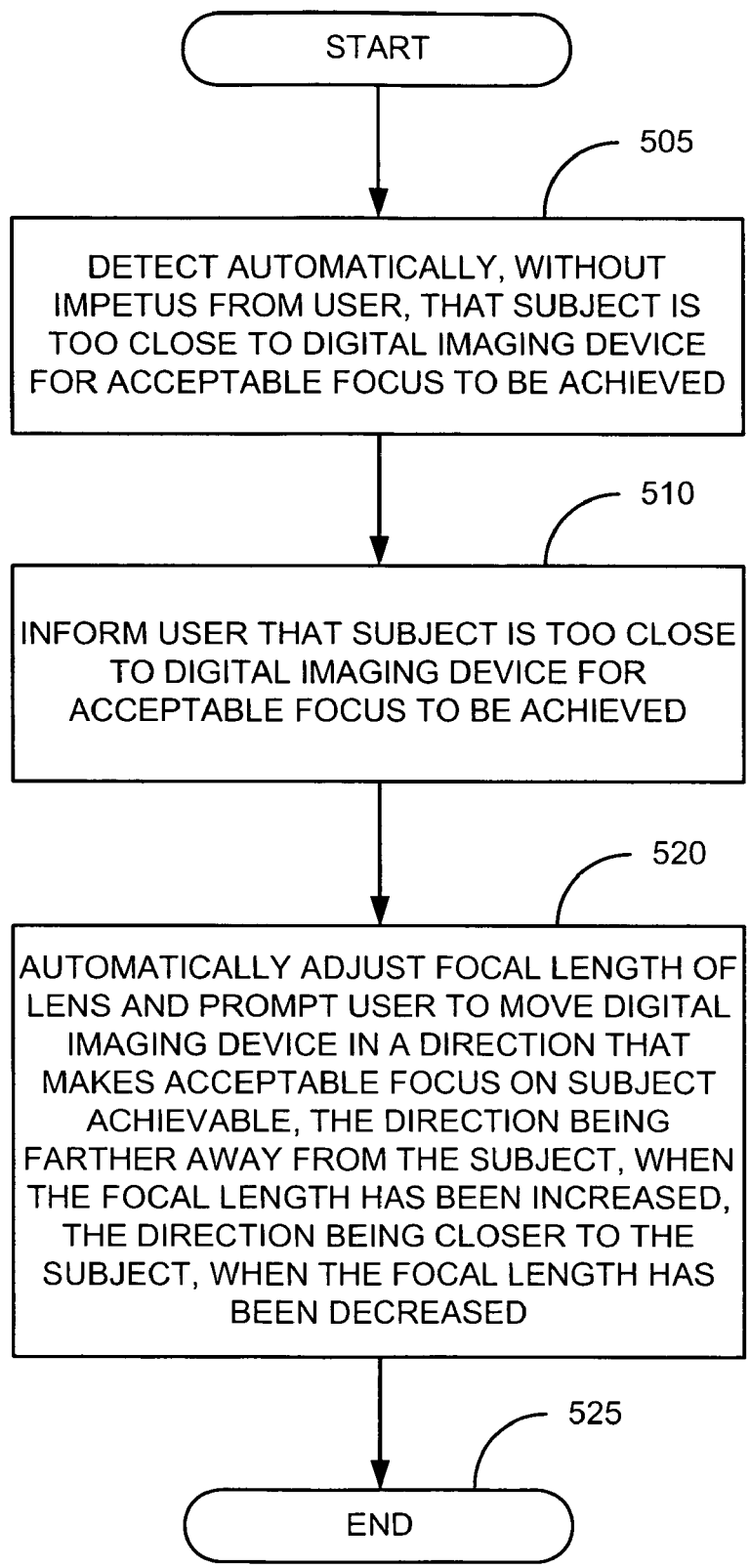
FIG. 5B is a flowchart of the operation of the digital imaging device shown in FIG. 1 in accordance with another illustrative embodiment of the invention.

FIG. 5B is a flowchart of the operation of digital imaging device 100 in accordance with another illustrative embodiment of the invention. In FIG. 5B, additional step 520 is performed after steps 505 and 510. At 520, focus control logic 135 may perform automatic correction and prompting of the user, as explained in connection with FIGS. 4A-4D. Specifically, focus control logic 135 may adjust the focal length of optical system 140 and prompt the user to move digital imaging device 100 in a direction that makes acceptable focus achievable, the direction being farther away from the subject, if the focal length has been increased, the direction being closer to the subject, if the focal length has been decreased. The process may then terminate at 525.

Figure 6:
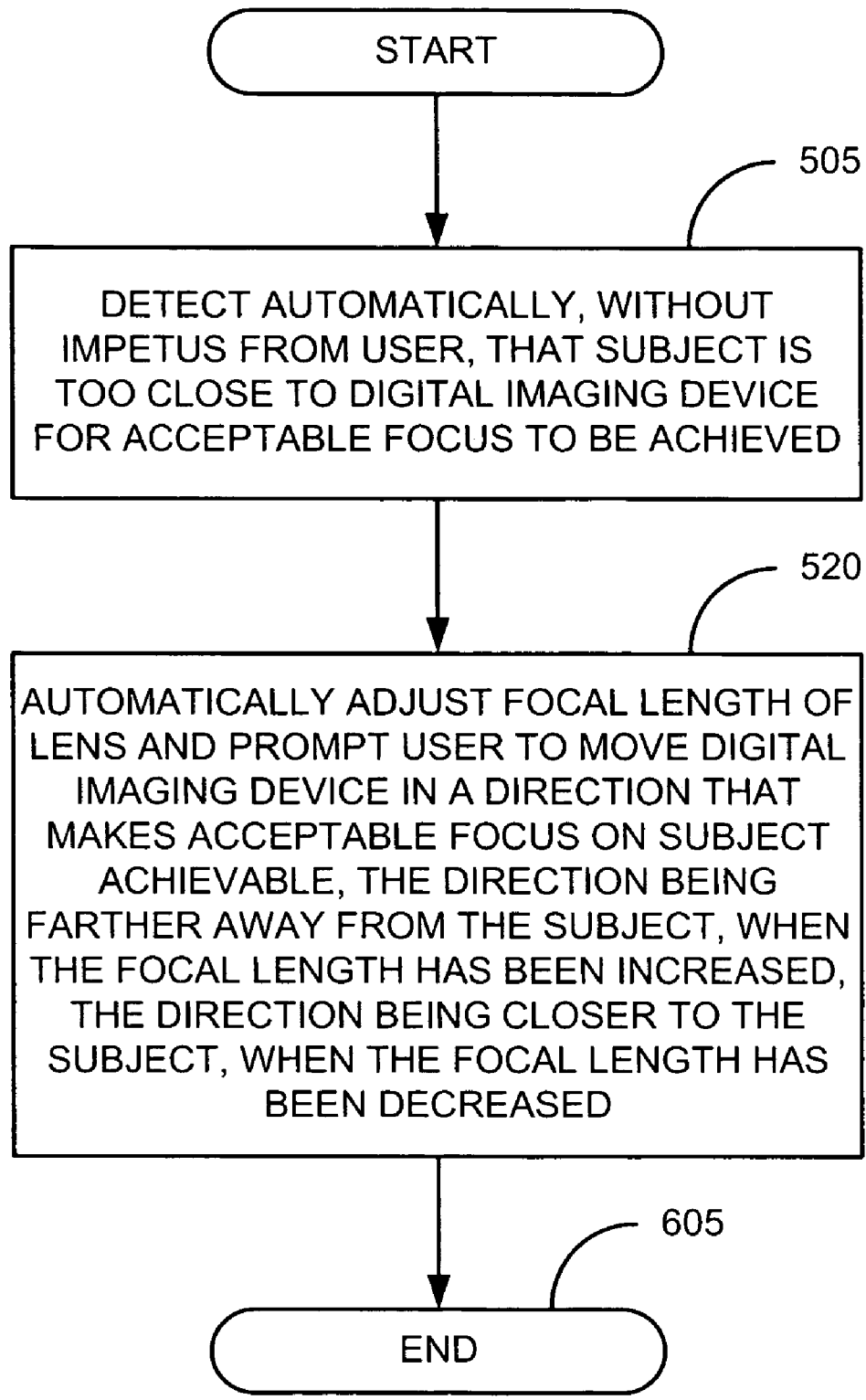
FIG. 6 is a flowchart of the operation of the digital imaging device shown in FIG. 1 in accordance with yet another illustrative embodiment of the invention.

FIG. 6 is a flowchart of the operation of digital imaging device 100 in accordance with yet another illustrative embodiment of the invention. In FIG. 6, step 510 has been omitted. That is, after step 505 has been performed, step 520 may be performed without informing the user explicitly that the subject is too close to digital imaging device 100 for acceptable focus to be achieved. At 605, the process may terminate.

Figure 7:
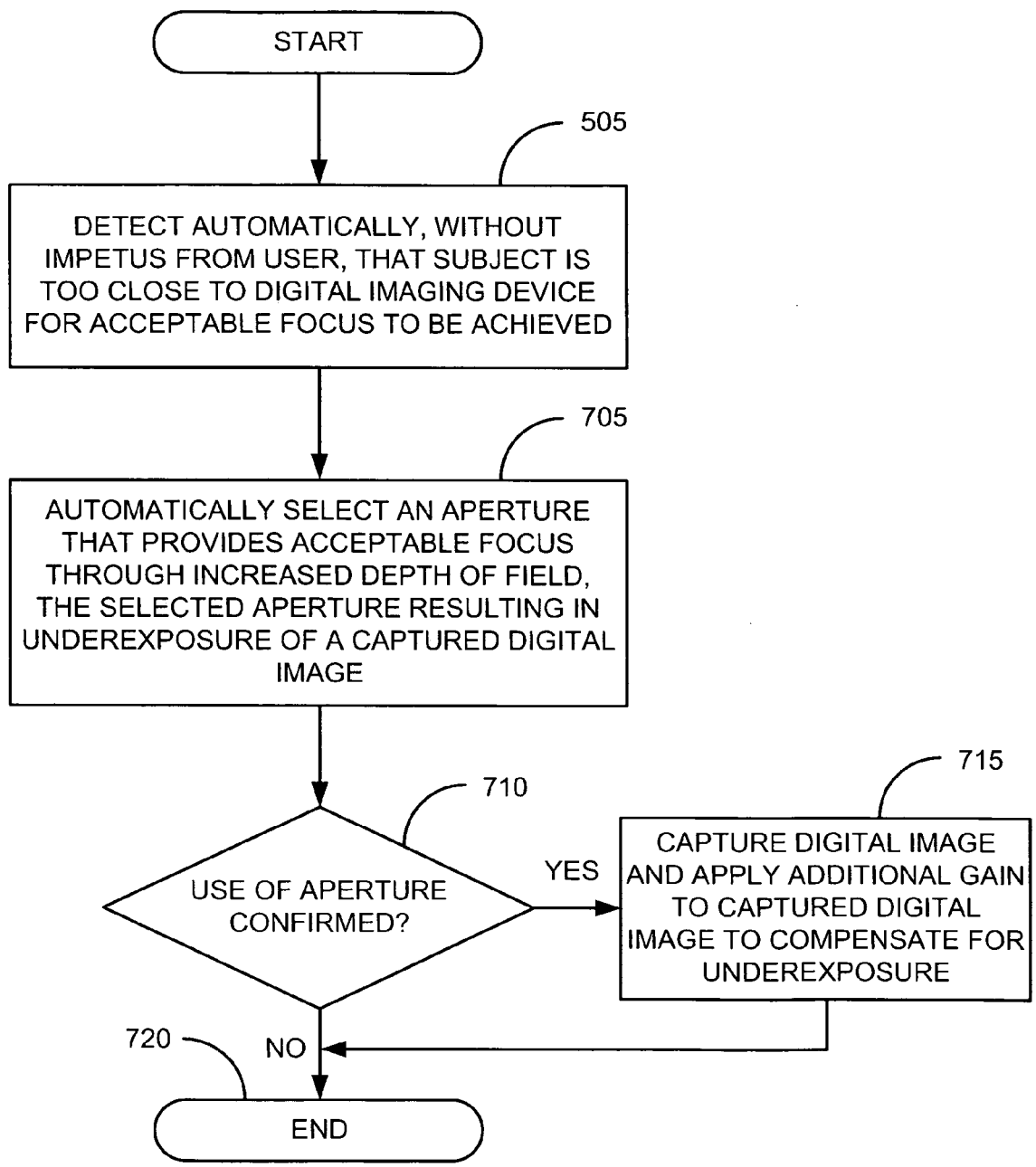
FIG. 7 is a flowchart of the operation of the digital imaging device shown in FIG. 1 in accordance with yet another illustrative embodiment of the invention.

FIG. 7 is a flowchart of the operation of digital imaging device 100 in accordance with yet another illustrative embodiment of the invention. In FIG. 7, focus control logic 135, at 705, may automatically select an aperture of optical system 140 that provides acceptable focus through increased depth of field. As indicated in FIG. 7, the selected aperture may be one that would result in underexposure of a subsequently captured digital image. Optionally, at 710, focus control logic 135 may inform the user that a better aperture is available for focus but that use of that aperture might result in degraded image quality. Further, focus control logic 135 may provide the user the option of confirming or canceling use of the selected aperture. If a digital image is ultimately captured, focus control logic may apply additional gain to the captured digital image at 715 to compensate for the underexposure. At 720, the process may terminate.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for automatically focusing a digital imaging device, comprising:
   detecting automatically, without impetus from a user after the digital imaging device is powered on, that a subject is too close to the digital imaging device for acceptable focus to be achieved; and
   informing the user that the subject is too close to the digital imaging device for acceptable focus to be achieve; and
   adjusting the focal length of a lens of the digital imaging device automatically and prompting the user to move the digital imaging device in a direction that makes acceptable focus on the subject achievable, the direction being farther away from the subject, when the focal length has been increased, the direction being closer to the subject, when the focal length has been decreased.

2. The method of claim 1, wherein the impetus from the user comprises the user depressing, even partially, a shutter button of the digital imagine device.

3. The method of claim 1, wherein detecting automatically, without impetus from a user, that a subject is too close to the digital imaging device for acceptable focus to be achieved comprises determining that focus is improving with iterative adjustment of a lens of the digital imaging device but that acceptable focus has not yet been achieved when the lens is focused at a minimum object distance.

4. The method of claim 1, wherein informing the user that the subject is too close to the digital imaging device for acceptable focus to be achieved comprises altering the appearance of a display of the digital imaging device.

5. The method of claim 4, wherein altering the appearance of a display of the digital imaging device comprises changing the color of a set of focus brackets to amber.

6. The method of claim 4, wherein altering the appearance of a display of the digital imaging device comprises displaying a text message.

7. A method for automatically focusing a digital imaging device, comprising:
   detecting automatically, without impetus from a user after the digital imaging device is powered on, that a subject is too close to the digital imaging device for acceptable focus to be achieved; and
   adjusting the focal length of a lens of the digital imaging device automatically and prompting the user to move the digital imaging device in a direction that makes acceptable focus on the subject achievable, the direction being farther away from the subject, when the focal length has been increased, the direction being closer to the subject, when the focal length has been decreased.

8. The method of claim 7, wherein the impetus from the user comprises the user depressing, even partially, a shutter button of the digital imaging device.

9. A digital imaging device, comprising:
   an optical system; and
   focus control logic configured to detect, without impetus from a user after the digital imaging device is powered on, that a subject is too close to the digital imaging device for the optical system to achieve acceptable focus and to inform the user that the subject is too close to the digital imaging device for the optical system to achieve acceptable focus;
   wherein the impetus from the user comprises the user depressing, even partially, a shutter button of the digital imaging device.

10. The digital imaging device of claim 9, wherein the focus control logic is configured to determine that focus is improving with iterative adjustment of the optical system but that acceptable focus has not yet been achieved when the optical system is focused at a minimum object distance.

11. The digital imaging device of claim 9, further comprising:
    a display; and
    wherein the focus control logic is configured to inform the user that the subject is too close to the digital imaging device for the optical system to achieve acceptable focus by altering the appearance of the display.

12. The digital imaging device of claim 11, wherein altering the appearance of the display comprises changing the color of a set of focus brackets to amber.

13. The digital imaging device of claim 11, wherein altering the appearance of the display comprises displaying a text message.

14. A digital imaging device, comprising:
    an optical system; and
    focus control logic configured to detect, without impetus from a user after the digital imaging device is powered on, that a subject is too close to the digital imaging device for the optical system to achieve acceptable focus; adjust a focal length of the optical system automatically; and
    prompt the user to move the digital imaging device in a direction that makes acceptable focus on the subject achievable, the direction being farther away from the subject, when the focal length has been increased, the direction being closer to the subject, when the focal length has been decreased.

15. The digital imaging device of claim 14, wherein the impetus from the user comprises the user depressing, even partially, a shutter button of the digital imaging device.

16. The digital imaging device of claim 14, wherein the focus control logic is further configured to inform the user that the subject is too close to the digital imaging device for acceptable focus to be achieved.

17. A digital imaging device, comprising:
    means for producing an optical image;
    means for detecting, without impetus from a user after the digital imaging device is powered on, that a subject is too close to the digital imaging device for the means for producing an optical image to achieve acceptable focus; and means for informing the user that the subject is too close to the digital imaging device for the means for producing an optical image to achieve acceptable focus; and means for adjusting the focal length of the means for producing an optical image automatically and prompting the user to move the digital imaging device in a direction that makes acceptable focus on the subject achievable, the direction being farther away from the subject, when the focal length has been increased, the direction being closer to the subject, when the focal length has been decreased.

18. A digital imaging device, comprising:

means for producing an optical image; means for detecting, without impetus from a user after the digital imaging device is powered on, that a subject is too close to the digital imaging device for the means for producing an optical image to achieve acceptable focus;

means for adjusting automatically a focal length, of the means for producing an optical image; and means for prompting the user to move the digital imaging device in a direction that makes acceptable focus on the subject achievable, the direction being farther away from the subject, when the focal length has been increased, the direction being closer to the subject, when the focal length has been decreased.

* * * * *

UNITED STATES PATENT AND TRADEMARK OFFICE
CERTIFICATE OF CORRECTION

PATENT NO. : 7,469,097 B2  
APPLICATION NO. : 11/305485  
DATED : December 23, 2008  
INVENTOR(S) : Jason E. Yost et al.

Page 1 of 1

It is certified that error appears in the above-identified patent and that said Letters Patent is hereby corrected as shown below:

In column 7, line 32, in Claim 1, delete "achieve;" and insert -- achieved; --, therefor.

In column 7, line 42, in Claim 2, delete "imagine" and insert -- imaging --, therefor.

In column 10, line 4, in Claim 18, after "length" delete ",".

Signed and Sealed this

Second Day of June, 2009

JOHN DOLL  
*Acting Director of the United States Patent and Trademark Office*